United States Patent [19]

Sumida

[11] Patent Number: 4,947,314
[45] Date of Patent: Aug. 7, 1990

[54] OPERATION CONTROL SYSTEM

[75] Inventor: Satoshi Sumida, Kawasaki, Japan

[73] Assignee: Kabushiki Kaisha Toshiba, Kawasaki, Japan

[21] Appl. No.: 196,061

[22] Filed: May 19, 1988

[30] Foreign Application Priority Data

May 21, 1987 [JP] Japan .................................. 62-124607

[51] Int. Cl.$^5$ .............................................. G06F 15/46
[52] U.S. Cl. .................................... 364/140; 364/468; 364/513
[58] Field of Search ............... 364/140, 468, 478, 513, 364/401, 403, 141–147, 200 MS File, 900 MS File

[56] References Cited

U.S. PATENT DOCUMENTS

| | | | |
|---|---|---|---|
| 3,942,158 | 3/1976 | Dummermuth | 364/900 |
| 4,503,507 | 3/1985 | Takeda et al. | 364/513 |
| 4,628,435 | 12/1986 | Tashiro et al. | 364/130 |
| 4,633,385 | 12/1986 | Murate et al. | 364/513 |
| 4,727,487 | 2/1988 | Masui et al. | 364/300 |
| 4,796,194 | 1/1989 | Atherton | 364/468 |
| 4,802,094 | 1/1989 | Nakamura et al. | 364/478 |

OTHER PUBLICATIONS

"Mark Flow Graph an Its Application to Complex Sequential Control System," Masuda et al., Proc. of Hawaii Int'l Conf. on System Sciences, 1980 pp. 194–203.
Advanced Robotics, vol. 1, No. 1, 1986 pp. 87–90 Article by Hasegawa et al.
"Simulation of Discrete Production Systems Based on Mark Flow Graph," Hasegawa et al., Systems Science, vol. 13, pp. 105–121, 1987.
"On Programming of Conventional Programmable Controller by Using Mark Flow Graph," Hasegawa et al., IEEE ISCAS '85 Proceedings pp. 933–937.
"A Petri Net Based Controller for Flexible and Maintainable Sequence Control and its Applications in Factory Automation", IEEE Trans. Industrial Electronics IE-33,1; T. Murata, et al; 1986. This article proposes a new type controller based on a Petri Net (a kind of directed graph) like control language.
Proc. IECON'86; M. Nagata; 1986 IEEE "Interprocess Communication for Robot Control", pp. 233–237.
IEEE Transactions on Industrial Electronics, vol. IE-33, No. 1, Feb. 1986, pp. 1–8, IEEE, T. Murata et al., "A Petri Net-Based Controller for Flexible and its Applications in Factory Automation".

Primary Examiner—Joseph Ruggiero
Attorney, Agent, or Firm—Cushman, Darby & Cushman

[57] ABSTRACT

An operation control system of the invention has an operational graph storage file for storing an operational graph in which unit operation data of items of FA equipment, which performs a series of tasks in association with each other, are arrayed in an execution order, in accordance with work progress states of the items of equipment. An operational graph interpreter reads out the unit operation data from the operational graph storage file, and supplies an operational command to each item of FA equipment, an operational response from each item being detected by a detector. The detector writes an interpretation result, corresponding to an item's operational state, on a blackboard, with reference to an interpretation rule storage file which stores operational responses of the items FA equipment and interpretation results of the corresponding operational states. The operational graph interpreter sequentially selects operations to be executed, with reference to the interpretation results of the operational states of the items of equipment to be controlled, as written in the blackboard.

13 Claims, 8 Drawing Sheets

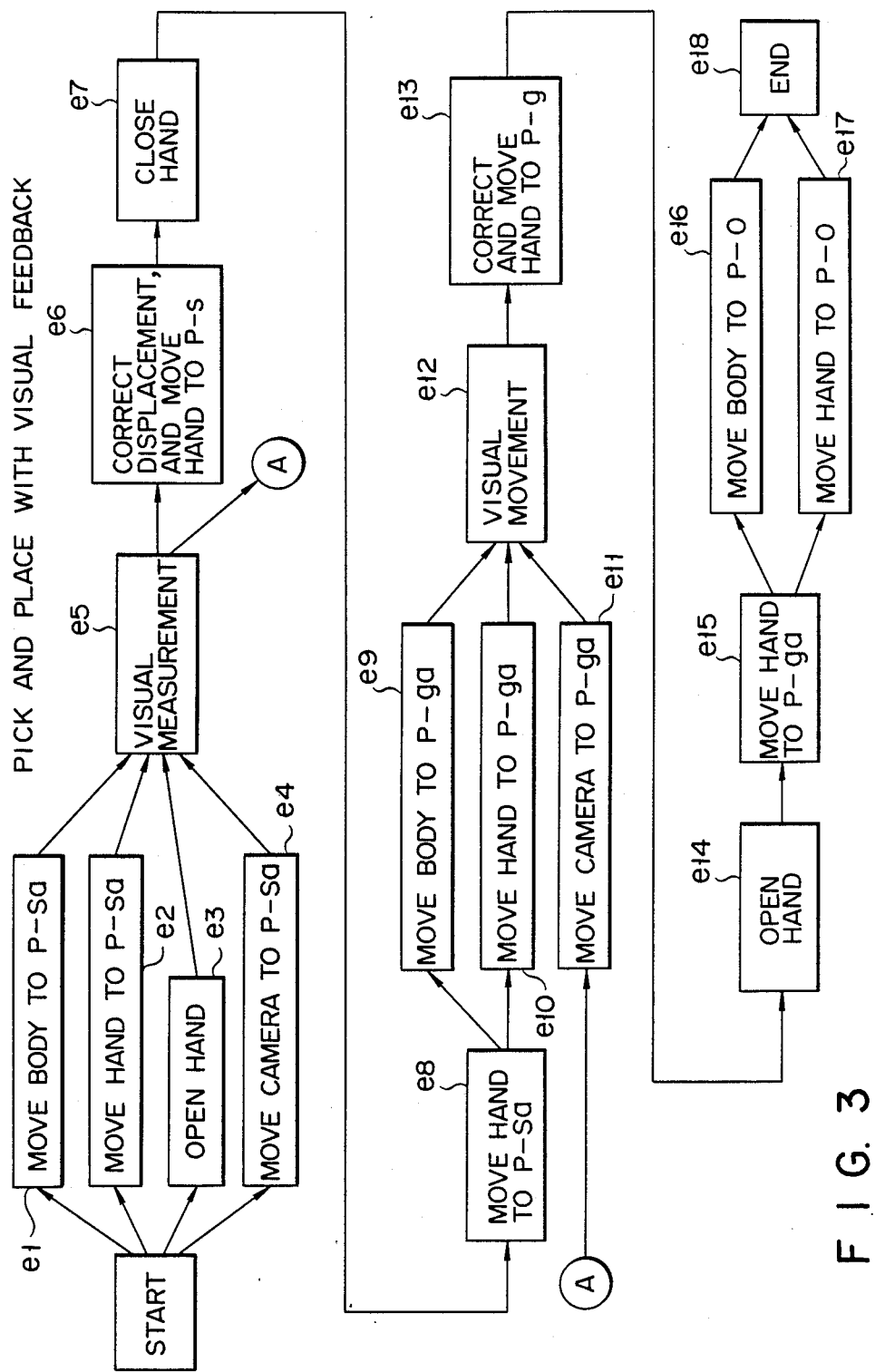
F I G. 3

| HAND MOVE | |
|---|---|
| EXECUTION | ROBOT |
| OPERATIONAL COMMAND | HAND OPEN |
| PARAMETER | 10 |
| START-UP CONDITION | BODY STOP |
| COMPLETION-DETERMINATION CONDITION | HAND STOP |

F I G. 4

```
IF  RECEPTION : FROM HAND "COMPLETION OF ACCEPTING
                                OPERATIONAL COMMAND"
              THEN "HAND IN OPERATION"
IF  RECEPTION : FROM HAND "COMPLETION OF OPERATIONAL
                                COMMAND"
              THEN "HAND STOP"

IF  "HAND IN CLOSING", RECEIVING FROM HAND "TOUCH
    SENSOR ON", AND "HAND STOP",
    THEN "HAND GRIPS WORK"
```

F I G. 5

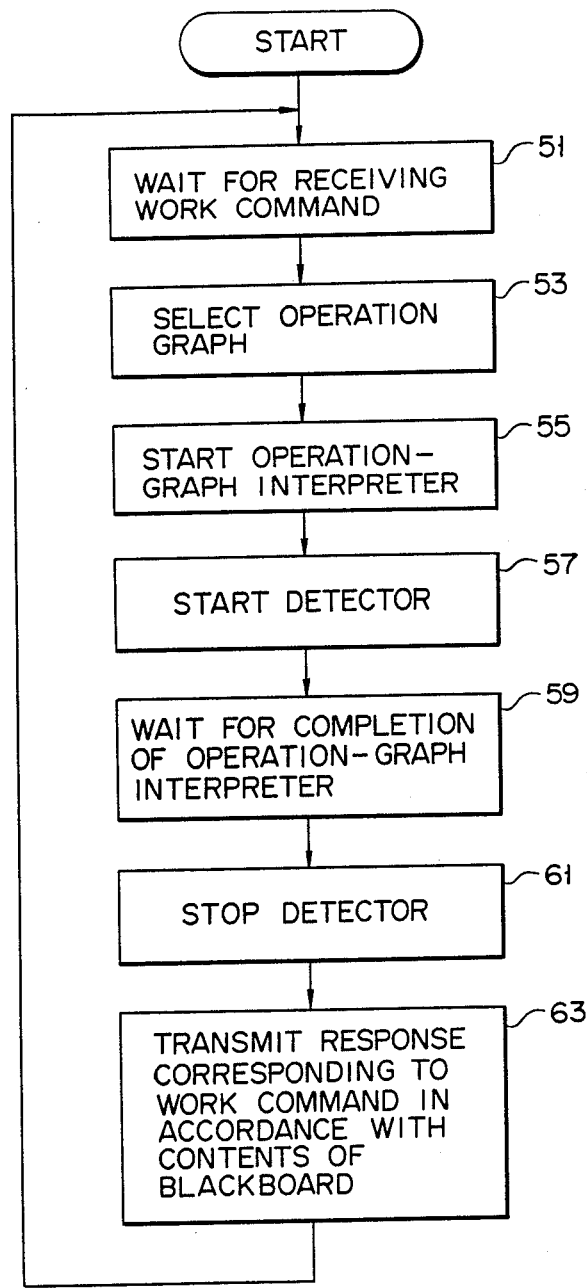
F I G. 6

OPERATION CONTROL SYSTEM

U.S. application Ser. No. 07/196,062 filed May 19, 1988, now U.S. Pat. No. 4,835,450 and U.S. application Ser. No. 07/196,063 filed May 19, 1988 are related applications.

BACKGROUND OF THE INVENTION

1. Field of the Invention

The present invention relates to an operation control system for starting and monitoring FA (Factory Automation) equipment such as a robot, a conveyor, and the like, and for systematically operating such FA equipment.

2. Description of the Related Art

Sequence control is a basic technique in automation, and is widely used in various industrial and social phases. For example, FIG. 1 shows a conventional system when a predetermined product is assembled using a robot. Robot 1, conveyor 3, and visual sensor 5 are respectively connected to and controlled by robot controller 7, programmable controller 9, and visual sensor controller 11. Controllers 7, 9, and 11 exchange with each other information of operational states of robot 1, conveyor 3, and visual sensor 5, so that robot 1, conveyor 3, and visual sensor 5 are controlled so that they operate in association with each other.

In the system described above, hand 13 of robot 1 is imaged and monitored by visual sensor 5, and information from sensor 5 is supplied to controllers 7 and 9. As a result, robot 1 executes a predetermined task in relation to parts 15 conveyed along conveyor 3, and assembles a product.

In this system, robot controller 7 is programmed in a robot language, and programmable controller 9 is programmed in a PC (Programmable Controller) language. This difference in program languages is disadvantageous from the point of view of exchange of operational state information among controllers 7, 9, and 11, rendering such exchange undesirably difficult. Thus, when a new item of FA equipment is added, and the control programs of controllers 7, 9, and 11 must be updated accordingly, this can only be done with considerable difficulty. As a result of the developments occurring in recent years, with regard to programmable controllers, computers, and the like, as well as the increase in the size of objects being controlled, control systems have tended to become increasingly complicated. In this case, the system has simultaneous and parallel characteristics, and phenomena such as an inoperable state, contention, overrun, and the like which do not occur in a system with a relatively simple structure may occur.

In order to solve the above softwave-related problem, a software system for an industrial sequence controller has been proposed. In "Proposal of Mark Flow Graph for Discrete System Control" by Kensuke HASEGAWA, Koji TAKAHASHI, Ryosuke MASUDA, and Hidemine OHNO in "*Keisoku Jidoseigyo Gakkai Ronbunshu*" VOL. 20, NO. 2, 1984, the Mark Flow Graph is proposed as a graphic technique effective for theoretically systematizing sequence control based on the Petri Net.

In "A Petri Net-Based Controller for Flexible and Maintainable Sequence Control and its Applications in Factory Automation" in IEEE TRANSACTIONS ON INDUSTRIAL ELECTRONICS VOL. IE-33, No. 1, Feb. 1986, a Petri Net-based controller is described.

However, according to a method for providing operation conditions using the Petri Net to execute FA equipment control, a network of the entire system must be constituted to clearly define all the FA equipment and all the states to be controlled. In addition, in order to describe the Petri Net, a user must be skilled in the creation thereof.

When the FA equipment are controlled, a robot may have intelligence so that it can be controlled by a rough command, requiring only a high-level control. However, low-level control must be performed for a hand and switches. Thus, levels of objects to be controlled are different. Therefore, when FA equipment is controlled using on command interpreter, the structure of the command interpreter is inevitably complicated. In addition, each time a new item of FA equipment is added, the entire command interpreter must be rewritten.

SUMMARY OF THE INVENTION

It is an object of the present invention to provide an operation control system which standardizes control program languages of FA equipment, and which, when a new item of FA equipment is added, can perform control by adding only a minimum number of control data and without changing a basic control program.

In order to achieve the above object, according to the present invention, an operation control system suitable for a plurality of equipment which have a function of receiving an operational command and sending back an operational response corresponding to the operational command, and have a function of executing a series of works in association with each other, comprises: operational graph storage means for storing an operational graph in which unit operational data groups are arrayed in accordance with an execution order of works based on work progress states of the equipment; state interpretation means for responsing the operational responses from the equipment and interpreting operational states of the equipment; status table storage means for storing interpretation results of the operational states from the state interpretation means; and operation execution means for sequentially selecting the unit operation data arrayed in the operational graph storage means based on the interpretation results of the operational state of the equipment written in the status table storage means with reference to the status table storage means, and for supplying an operational command to equipment which are ready for execution.

According to the present invention, an operational graph in which control information for controlling different levels of FA equipment is described is created in correspondence with unit operations for these FA equipment. An operational state of each FA equipment is detected by a detector, and is described in a language which an operational graph interpreter can understand. Therefore, the operational graph interpreter can determine an operational state of the FA equipment regardless of the level of the FA equipment to be controlled. If a new FA equipment is added, modified, or omitted, the content of an operational graph storage file need only be updated, and the operational graph interpreter need not be updated. The detector refers to an interpretation rule storage file to detect the operational states of FA equipment of different levels. The interpretation rule storage file stores a plurality of interpretation rules each representing a phenomenon and a corresponding operation state in the form of if . . . then . . . in accordance with FA equipment of different levels. Therefore, even if a new FA equipment is added, modified, or omitted, the content of the interpretation rule storage file need only be updated, and the detector need not be updated.

Therefore, other FA equipment can be easily combined, and extendability of the entire system can be improved. System maintenance is rendered easy. In addition, since operational states of body 19, hand 21, and the like in operation are written in blackboard 35, the work states can be easily detected, and a countermeasure can be easily taken when an abnormality occurs.

BRIEF DESCRIPTION OF THE DRAWINGS

Other objects and features of the present invention will be apparent from the following description taken in connection with the following figures in which:

FIG. 3 is a chart showing an operational graph storage file shown in FIG. 2;

FIG. 4 is a table showing unit operation data of each FA equipment described in a node shown in FIG. 3;

FIG. 5 is a view showing an interpretation rule stored in an interpretation rule storage file shown in FIG. 2;

FIG. 6 is a flow chart showing processing of a command interpreter shown in FIG. 2;

DETAILED DESCRIPTION OF THE PREFERRED EMBODIMENTS

Figure 1:
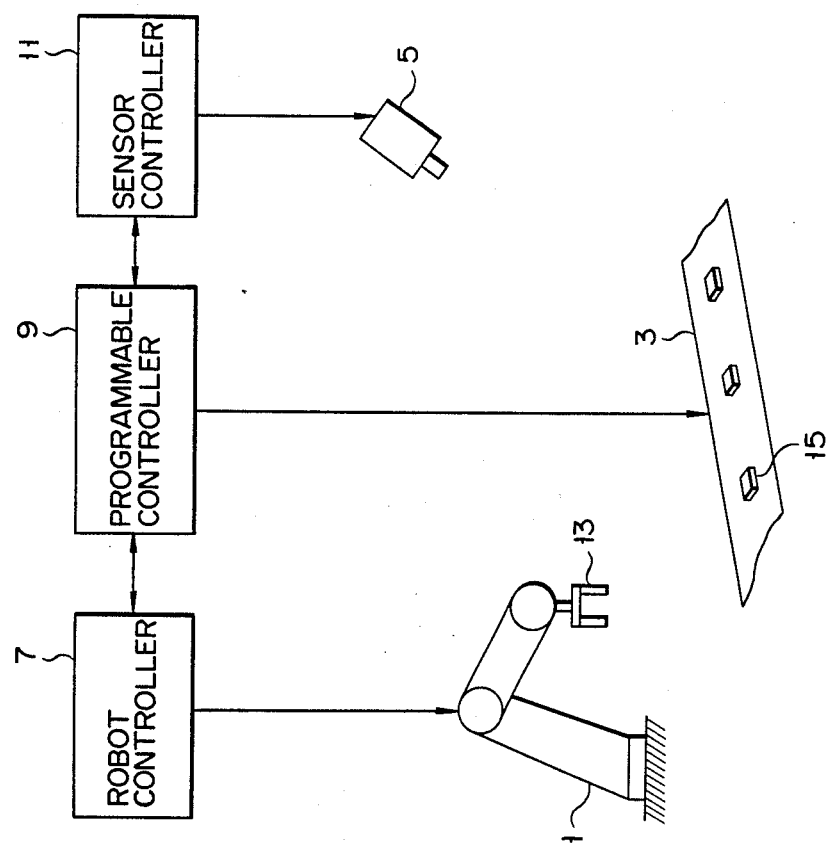
FIG. 1 is a block diagram showing a typical system configuration when a predetermined product is assembled using a robot as an application of sequence control in factory automation.
Figure 2:
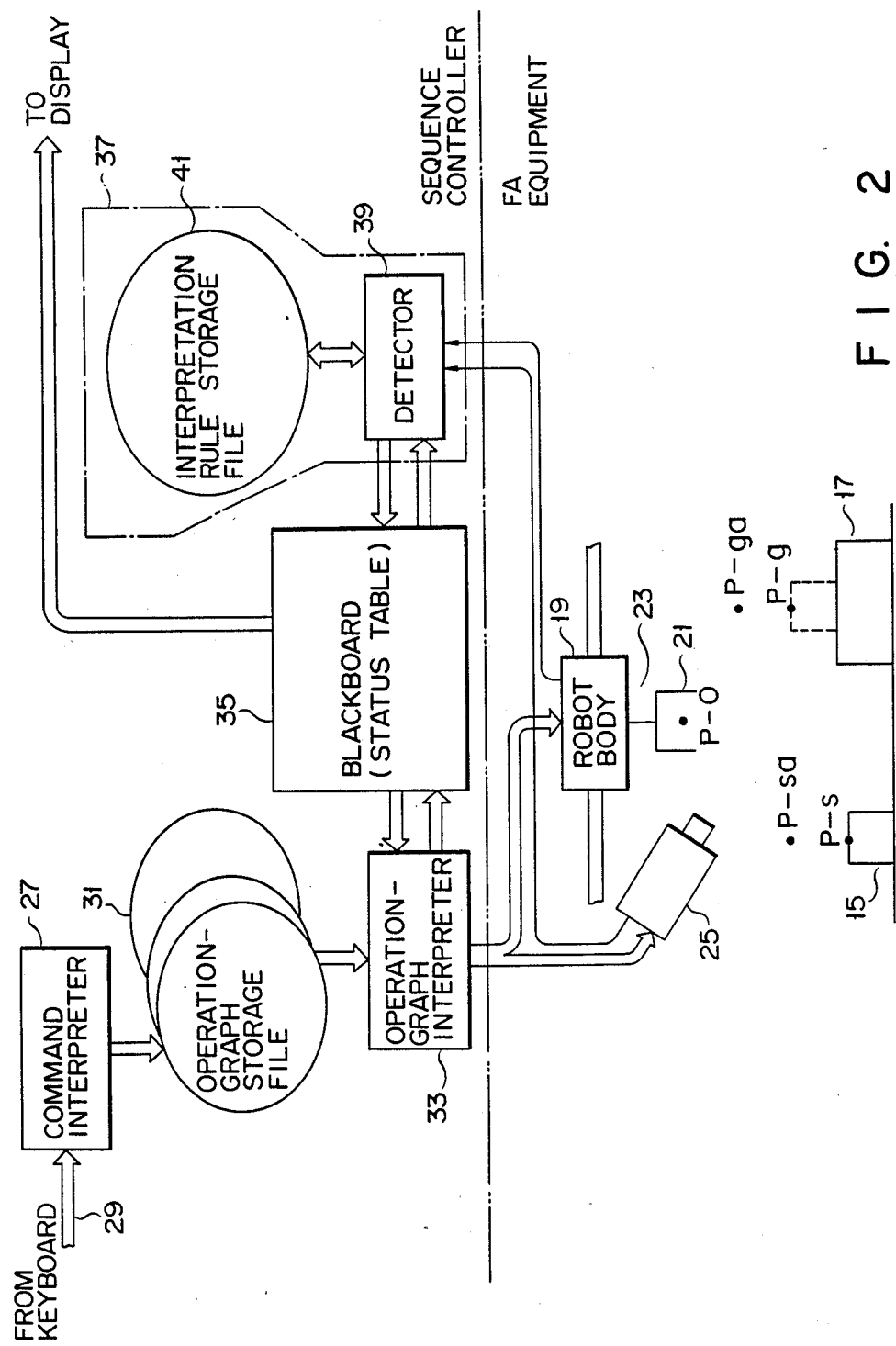
FIG. 2 is a diagram of a system configuration of an operation controller for an FA equipment according to the present invention.

FIG. 2 is a block diagram showing an embodiment of a sequence controller for a factory automation (FA) equipment as an operation control system according to the present invention.

In this embodiment, an operation control system is applied to an operation wherein robot 19 places work 15 at a predetermined position on jig 17. In FIG. 2, P-o, P-sa, P-s, P-ga, and P-g respectively represent an original position, a start approach position, a start position, a goal approach position, and a goal position.

In this embodiment, in FIG. 2, a portion above an alternate long and two short dashed line corresponds to a sequence controller, and a portion therebelow corresponds to an FA equipment. However, the present invention can be arranged such that the sequence controller is incorporated in an FA equipment group, or the function of the sequence controller ca be partially incorporated in the FA equipment group. The FA equipment group consists of robot 23 having body 19 of one degree of freedom and hand 21 of two degrees of freedom, and visual sensor 25. Note that robot 23, body 19, and hand 21 can be individually controlled.

Command interpreter 27 receives a work command from an external device through bus line 29, and accesses operational graph storage file 31 (to be described later) and selects operational graph storage file 31 in which a work content corresponding to the work command is written. Then, interpreter 27 outputs the selected file to operational graph interpreter 33 (to be described later). After the FA equipment completes a work, interpreter 27 sends back a result to a source which issued the work command. In this embodiment, an operation control system comprises a 32-bit engineering work station, as shown in FIG. 2. The source which issues the work command is different depending on whether the system shown in FIG. 2 corresponds to a stand-alone system or a hierarchical network shown in FIG. 9. When the system shown in FIG. 2 is of stand-alone type, the work command is input by an operator at a keyboard of the engineering work station. Therefore, command interpreter 27 feeds back the work result to a display apparatus or a printing apparatus through a CPU of the engineering work station. When the system shown in FIG. 2 is the hierarchical network, the work command issue source is a host system. Therefore, command interpreter 27 feeds back the work result to the host system.

Operational graph storage file 31 is a group of unit operation data for instructing an operation of each FA equipment upon execution of an order command externally input from a host system. More specifically, the FA equipment group performs a series of works in association with each other. Therefore, a unit operation group of each FA equipment is arrayed in its execution order in correspondence with the work progress state of each FA equipment. In this embodiment, one operational graph storage file is prepared for a single work command. A plurality of such operational graph storage files are stored in, e.g., a magnetic disk apparatus.

For example, the content of operational graph storage file 31 corresponding to a work command "PICK AND MOVE WITH VISUAL FEEDBACK" for placing work 15 at a predetermined position on jig 17 is as shown in FIG. 3. Referring to FIG. 3, e1 through e18 are nodes which can be executed to perform the work command. Unit operation data of the FA equipments are described in nodes e1 through e18. The unit operation data include movement of a body, movement of a hand, hand open, movement of a camera, visual measurement, correction and movement of hand offset, hand close, and the like. The operation orders of nodes e1 through e18 are indicated by directed arcs—→. The content of each node comprises designation of an FA equipment to be controlled, an operation content, a parameter representing an operation condition, a start-up condition, a completion-determination condition, and the like. For example, FIG. 4 shows the content of hand open of node e3. As shown in FIG. 4, execution is made to robot 23, its operation content is to open hand 21, and a parameter of a degree of hand open is "10". As the start-up condition for sending the unit operation data as an operational command, a condition that movement of body 19 is stopped is designated. The start-up condition is designated when a given node is started in preference to other nodes or is exclusively controlled when a plurality of nodes are parallelly executed. For example, in FIG. 3, nodes e1 through e4 are arrayed to be parallelly operated. Assuming that the start-up condition of node e3 is "body stop" and that of node e1 is "hand stop", hand open of node e3 and body movement of node e1 can be controlled exclusive to each other. More specifically, hand open of node e3 is started after body 19 of node e1 is stopped. Alternatively, body movement of node e1 is started after hand open of node e3 is completed. In priority start, if the start-up condition of node e3 is "e2 is already started", even if nodes e1 and e2 are parallelly operated, the priority order is given to their start.

The completion-determination condition represents a condition for determining a completion determination state of a corresponding operation. In the case of hand open shown in FIG. 4, when the state of "hand stop" is established after hand open is started, it is determined that this operation is completed.

Referring back to FIG. 2, operational graph interpreter 33 has a function of an operation execution means. Operational graph interpreter 33 is written in status table (to be referred to as a blackboard hereinafter) 35. Interpreter 33 fetches each unit operation data in operational graph storage file 31 in the arrayed order while checking the operational states of robot 23 and visual sensor 25 and sends the fetched data to robot 23 and visual sensor 25 as read operational commands. Blackboard 35 is formed in, e.g., a main memory in the engineering work station. State interpretation means 37 interprets the operational states of robot 23 and visual sensor 25 upon reception of operational response therefrom, and writes the interpretation results in blackboard 35. State interpretation means 37 comprises detector 39 and interpretation rule storage file 41. Interpretation rule storage file 41 stores operational responses and interpretation results corresponding to the operational states in the form of "if..., then...", as shown in FIG. 5. For example, if detector 39 receives if clause "operational response of completion of accepting operational command", it retrieves interpretation rule storage file 41 using the if clause as a parameter. When detector 39 detects the same if clause, it writes then clause "hand in operation" in blackboard 35.

The operation of the operation control system with the above arrangement will be described hereinafter. FIG. 6 is a flow chart showing processing of command interpreter 27. In step 51 of FIG. 6, command interpreter 27 waits for an input of a work command. If the work command is input, interpreter 27 selects and starts an operational graph corresponding to the input work command from operational graph storage file 31. When the selected operational graph storage file is started, command interpreter 27 starts operational graph interpreter 33 in step 55. As a result, the task of the operational graph interpreter shown in FIG. 7 runs. While the task of the operational graph interpreter runs, command interpreter 27 starts detector 39 in step 57. As a result, the task of the detector shown in FIG. 8 runs. More specifically, in this embodiment, multi-task processing is performed. In steps 59, completion of operational graph interpreter 33 is waited. Upon completion of execution of interpreter 33, CPU 1 stops detector 39. Interpreter 27 sends back an operational state of an FA equipment written in the blackboard to a work command issue source in step 63.

Figure 7:
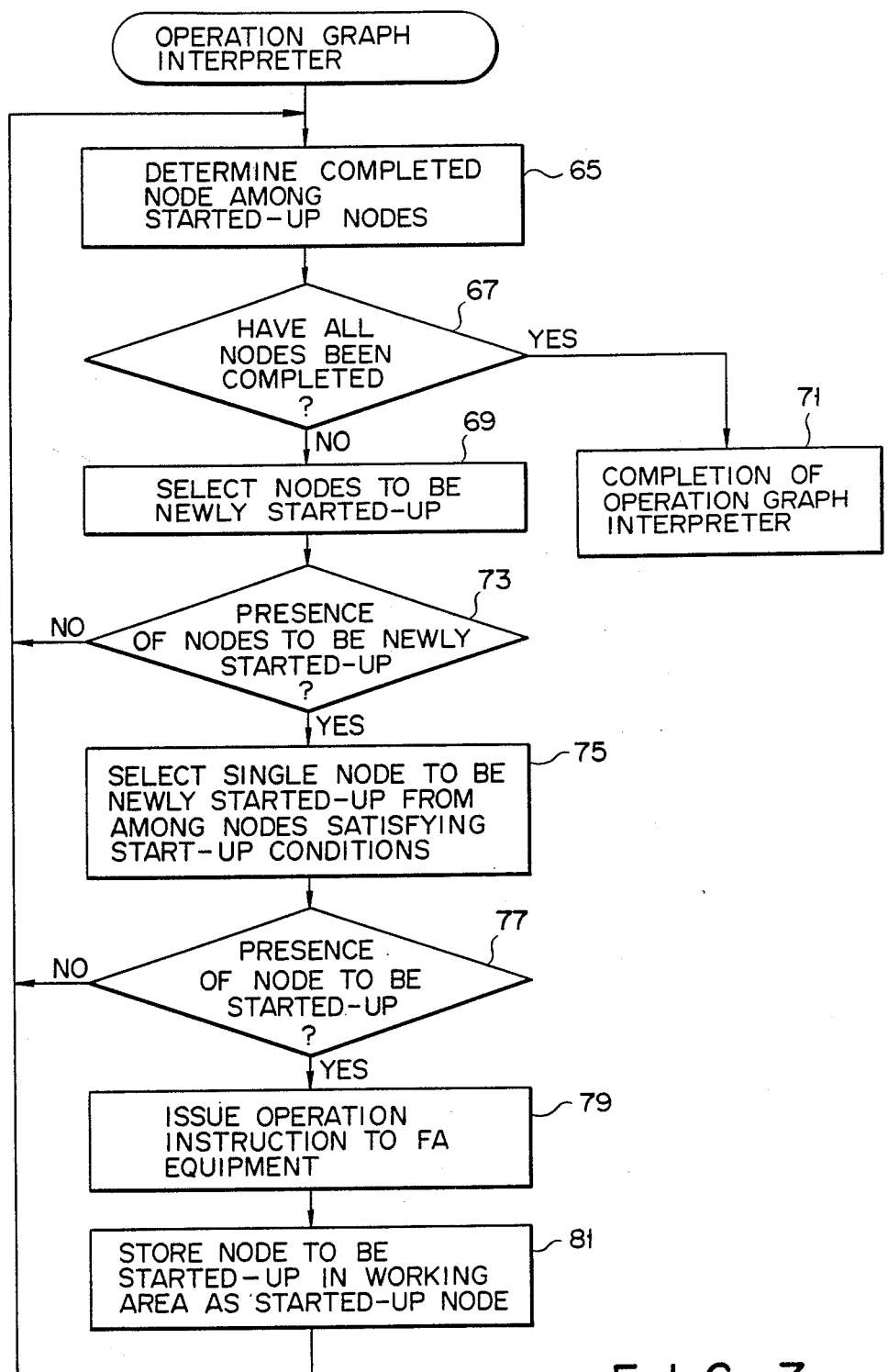
FIG. 7 is a flow chart showing processing of an operational graph interpreter shown in FIG. 2.

The operational graph interpreter will be described with reference to the flow chart of FIG. 7. In step 65, interpreter 33 determines a completed node among started-up nodes. Interpreter 33 determines in step 67 if execution of all the nodes is completed. If YES in step 67, completion of the operational graph interpreter is signaled to command interpreter 27.

If NO in step 67, however, nodes to be newly started-up are selected in step 69. Interpreter 33 checks in step 73 if the nodes to be newly started-up are present. If NO in step 73, the flow of interpreter 33 returns to step 65, and steps 65 through 73 are executed again. However, if YES in step 73, interpreter 33 selects a single node to be newly started-up from among nodes satisfying start-up conditions written in blackboard 35 in step 75. (For example, node e1 in FIG. 3 is selected.) More specifically, assuming that a plurality of nodes are present, interpreter 33 refers to blackboard 35 to check if the start-up conditions of the plurality of nodes to be started-up are written. If written, the interpreter starts up the corresponding node. If a plurality of nodes whose start-up conditions are written are present, one node is selected depending on the internal structure of the operational graph interpreter. For example, a first recognized node is started up.

In step 77, it is checked if nodes satisfying the start-up conditions are present. If NO in step 77, the flow of interpreter 33 returns to step 65, and steps 65 through 77 are executed again.

However, if YES in step 77, interpreter 33 issues an operational command representing a node to be started-up to the corresponding FA equipment in step 79. (For example, for node e1, a move command is issued to body 19.) Interpreter 33 stores the node to be started-up in a working area of interpreter 33 as a started-up node in step 81. In this manner, interpreter 33 issues operational commands representing nodes to be started-up. (For example, interpreter 33 sequentially starts operational commands represented by nodes e1, e2, and e4, that is, move commands to the body, the hand, and the camera. Node e3 is not started since its start-up condition "body stop" is not satisfied.)

Figure 8:
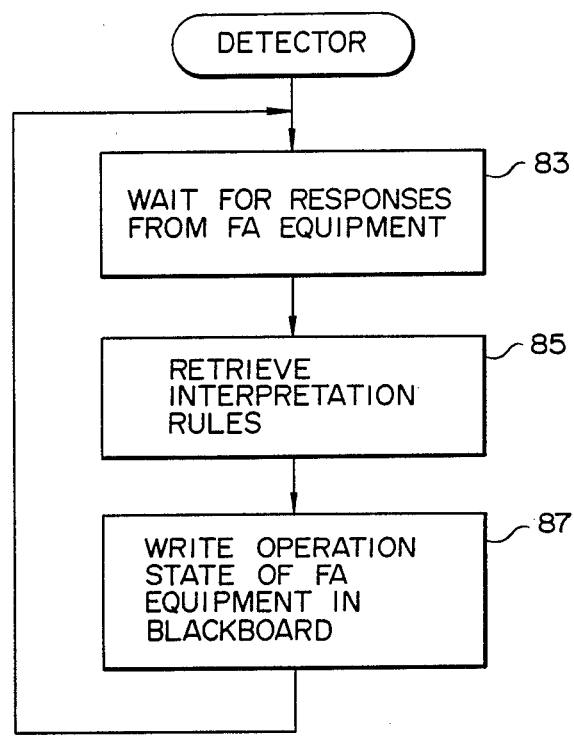
FIG. 8 is a flow chart showing processing of a detector shown in FIG. 2.

Meanwhile, command interpreter 27 executes a detector start command in step 57 in FIG. 6, thereby causing the detector processing task shown in FIG. 8 to run. More specifically, in step 83 in FIG. 8, detector 39 waits for operational responses from robot 23 and visual sensor 25. In this state, if an operational response, e.g., an operational response "completion of accepting operational command" of body 19 corresponding to the operational command of node e1 is input from a controller (comprising, e.g., an 8- through 32-bit 1-chip microcomputer) of robot 23, detector 39 retrieves the interpretation rules stored in interpretation rule storage file 41 in step 85. Detector 39 writes the operational state "body in operation" corresponding to the operational response in blackboard 35, in step 87. When the operational response "completion of accepting operational command" is received from hand 21 of robot 23, detector 39 writes the operational state "hand in operation" in blackboard 35. In this manner, the operational commands are sequentially issued from operational graph interpreter 33, and the operational responses corresponding to these operational commands are sent back from body 19 and hand 21 of robot 23 and visual sensor 25. Then, these operational responses are interpreted and the corresponding interpretation results are written in blackboard 35.

Meanwhile, the flow returns to step 65, and interpreter 33 detects that a change in states upon operations of FA equipment is written in blackboard 35. Interpreter 33 then compares the completion-determination conditions of the started-up nodes stored in the operational graph storage file (see FIG. 4) and the content of blackboard 35 so as to detect the completed nodes among the started-up nodes. For each completed node, interpreter 33 rewrites a node written in the working area as "started-up" to be "completed". If all the nodes are completed, interpreter 33 signals completion of the operational graph interpreter processing to command interpreter 27 in step 71, as described above.

When steps 65 through 81 are repetitively executed, and if it is determined in step 65 that all the operations of nodes e1 through e4 are completed, node e5 is selected as a node to be newly started-up in step 69. The unit operation data of node e5 is read out from operational graph storage file 31, and visual measurement is performed. In visual measurement, high-precision positioning of hand 21 is executed In a detailed method of the visual measurement, if three-dimensional measurement is performed, for example, stereoscopic measurement is performed using two cameras or slit light is projected to measure its deflected state. An image signal obtained by imaging of visual sensor 25 is sent to an image processing apparatus (not shown), and the positional relationship between hand 21 and work 15 is calculated from the image data in the image processing apparatus, thereby obtaining an offset from an optimal position at which hand 21 holds work 15. When the measurement result of visual measurement and the operational state of completion of the operation are written in blackboard 35, operational graph interpreter 33 reads unit operation data "move hand 21 to position P-s in consideration of offset" of node e6 to be newly started-up, and issues the operational command to robot 23. When the operation of hand 21 corresponding to the operational command is completed, the operational command "hand command" as the unit operation data of node e7 to be newly started-up is issued to robot 23. As a result, hand 21 holds work 15.

Thereafter, interpreter 33 reads out the unit operation data of nodes e8 through e18 while checking the operational states of body 19, hand 21, and visual sensor 25 written in blackboard 35, and issues the corresponding operational commands. More specifically, at node e8, hand 21 is moved to position P-sa (start approach position). At nodes e9 and e10, body 19 is moved to position P-ga (goal approach position), and hand 21 is moved to position P-ga. At node e11, visual sensor 25 is directed toward position P-ga, and at node e12, visual measurement is executed again. At this time, in the visual measurement, an offset of work 15 from a position at which work 15 is to be placed on jig 17 is measured. At node e13, hand 21 is moved to position P-g (goal position) in consideration of the offset, and at node e14, hand 21 is opened. At node e15, hand 21 is moved to position P-ga. At nodes e16 and e17, body 19 and hand 21 are returned to position P-o (original position), i.e., initial states. At node e18, interpreter 33 determines in step 67 that all the nodes are completed, and the flow advances to step 71. Then, interpreter 33 records completion of the work in blackboard 35.

In this manner, in the above embodiment, upon reception of the operational responses from body 19, hand 21, visual sensor 25, the operational states of body 19, hand 21, and visual sensor 25 are written in blackboard 35. Interpreter 33 sequentially fetches unit operation data e1 through e18 arrayed in operational graph storage file 31 while checking the operational states written in the blackboard, and supplies them to body 19, hand 21, and visual sensor 25 as the operational commands.

Note that the present invention is not limited to the above embodiment.

Figure 9:
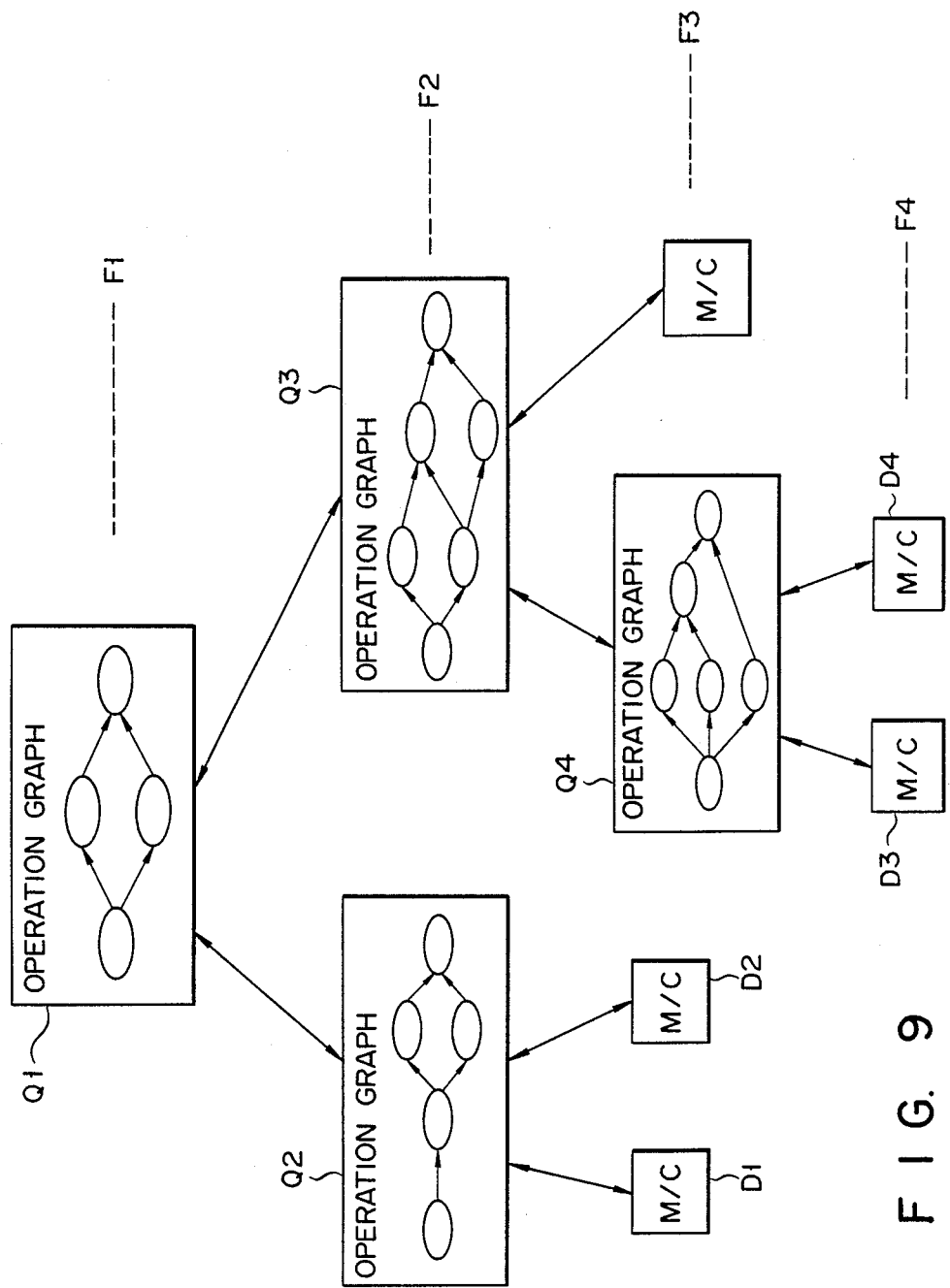
FIG. 9 is a chart showing a modification of an embodiment shown in FIG. 2.

As shown in FIG. 9, the system of the present invention may be constituted in a hierarchical network, e.g., FA controller Q1 of upper level F1 for main control, FA controllers Q2 and Q3 of lower level F2 for controlling robot D1 and conveyor D2, and FA controller Q4 of still lower level F3 for controlling joint D3 and hand D4, thus achieving hierarchical control. Note that FA controllers Q1 through Q4 have the same control function, and exchange information with each other in response to work commands and control responses.

In the above embodiment, the operation control system of the present invention is constituted by a 32-bit engineering work station. However, the number of bits of the CPU can be arbitrarily selected The operation control system is independently arranged as an FA equipment. However, all the functions of the operation control system may be incorporated in the FA equipment or the functions of the operation control system may be partially incorporated in the FA equipment.

What is claimed is:

1. An operation control system for a plurality of items of equipment which have a function for receiving an operational command and sending back an operational response corresponding to the operational command, and have a function of executing a series of tasks in association with each other, comprising:

operational graph storage means for storing an operational graph in which unit operation data groups are arrayed in accordance with an execution order of tasks, based on task progress states of said items of equipment;

state-interpretation means for receiving the operational responses from said items of equipment and interpreting operational states of said items of equipment;

status table storage means for storing the interpretation result of the operational state from said state interpretation means; and operational graph interpretation means for sequentially selecting the unit operation data arrayed in said operational graph storage means, based on the interpretation results of the operational states of said items of equipment, as written in said status table storage means with reference to said status table storage means.

2. A system according to claim 1, wherein the operational graph of said operational graph storage means is updated in correspondence with addition, updating, and omission of an item of equipment.

3. A system according to claim 1, wherein said state interpretation means comprises:

detector means for detecting the operational responses of said items of equipment; and interpretation rule storage file means for storing the interpretation results of the operational states of said items of equipment, and wherein the operational graph of said interpretation rule storage file means is rewritten in accordance with addition, updating, and omission of a new item of equipment.

4. A system according to claim 1, wherein a plurality of said operating control systems are constituted in a hierarchical network, each of said operational control systems performing control functions and exchanging information with each other in response to operational commands and operations responses.

5. A system according to claim 1, wherein said operational graph storage means stores one operational graph in correspondence with a single task of each of said items of equipment.

6. A system according to claim 1, wherein the unit operation data consists of first data for specifying an item of equipment to be controlled, second data indicating an operational command parameter, third data indicating a start-up condition for sending the unit operation data as the operational command, and fourth data indicating a completion-determination condition for determining completion of the operation.

7. A system according to claim 1, wherein the unit operation data are executed in a priority order and are executed in parallel fashion.

8. A system according to claim 1, wherein said items of equipment comprise factory automation equipment of different control function levels, and said operational graph storage means describes the unit operation data for all said items of equipment by use of a standardized language.

9. A system according to claim 3, wherein said operation execution means and said detector means are operated in parallel fashion.

10. A system according to claim 1, wherein said items of equipment comprise factory automation equipment.

11. A sequence control system comprising:
a group of items of equipment to be controlled which have a function for receiving an operational command and sending back an operational response corresponding to the operational command, and have a function for executing a series of tasks in association with each other;
operational graph storage means for storing an operational graph in which unit operation data groups are arrayed in accordance with an execution order of tasks, based on work progress states of said items of equipment; interpretation rule storage means for storing interpretation rules for said items of equipment;
detector means for retrieving the corresponding interpretation results of operational states stored in said interpretation rule storage means, in response to operational responses from said items of equipment, and interpreting the operational states of said items of equipment;
status table storage means for storing the interpretation results from said detector means; and
operational graph interpretation means for sequentially selecting the unit operation data arrayed in said operational graph storage means, based on the interpretation results of the operational states of said items of equipment, as written in said status table storage means with reference to said status table storage means.

12. A system according to claim 11, wherein when an item of equipment is added, modified, or omitted, only the operational graph of said operational graph storage means and said interpretation rule storage means are updated.

13. A system according to claim 11, wherein a plurality of said operational control systems are constituted in a hierarchical network, each of said operation control systems having the same control function, and exchanging information with each other in response to operational commands and operation responses.

* * * * *